(12) United States Patent
Makhervaks et al.

(10) Patent No.: US 7,539,780 B2
(45) Date of Patent: May 26, 2009

(54) ASYNCHRONOUS COMPLETION NOTIFICATION FOR AN RDMA SYSTEM

(75) Inventors: Vadim Makhervaks, Yokneam (IL); Giora Biran, Yaakov (IL); Zorik Machulsky, Nahariya (IL)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 10/724,783

(22) Filed: Dec. 1, 2003

(65) Prior Publication Data

US 2005/0117430 A1 Jun. 2, 2005

(51) Int. Cl.
G06F 15/16 (2006.01)
G06F 15/167 (2006.01)
G06F 13/28 (2006.01)
(52) U.S. Cl. .................. 709/250; 709/212; 709/216; 709/217; 710/22
(58) Field of Classification Search .................. 709/250, 709/212, 216, 217; 710/22
See application file for complete search history.

(56) References Cited

U.S. PATENT DOCUMENTS

| 5,671,365 | A * | 9/1997 | Binford et al. ............. 710/100 |
| 5,875,343 | A * | 2/1999 | Binford et al. ............. 710/263 |
| 6,070,189 | A * | 5/2000 | Bender et al. ............. 709/224 |
| 6,594,712 | B1 * | 7/2003 | Pettey et al. ............. 710/22 |
| 6,601,148 | B2 * | 7/2003 | Beukema et al. ............. 711/153 |
| 6,691,217 | B2 * | 2/2004 | Beukema et al. ............. 711/170 |
| 6,711,644 | B1 * | 3/2004 | Accapadi et al. ............. 710/263 |
| 6,718,370 | B1 * | 4/2004 | Coffman et al. ............. 709/212 |
| 6,901,463 | B2 * | 5/2005 | Jay et al. ............. 710/52 |
| 7,116,673 | B2 * | 10/2006 | Kashyap et al. ............. 370/412 |
| 7,177,941 | B2 * | 2/2007 | Biran et al. ............. 709/232 |
| 7,200,688 | B2 * | 4/2007 | Day et al. ............. 710/22 |
| 7,224,692 | B2 * | 5/2007 | Fan ............. 370/394 |
| 7,290,051 | B2 * | 10/2007 | Dobric et al. ............. 709/224 |
| 7,383,312 | B2 * | 6/2008 | Biran et al. ............. 709/212 |
| 7,404,190 | B2 * | 7/2008 | Krause et al. ............. 719/318 |
| 7,457,861 | B1 * | 11/2008 | Ebersole et al. ............. 709/223 |
| 2002/0062402 | A1 * | 5/2002 | Regnier et al. ............. 709/313 |
| 2002/0078265 | A1 * | 6/2002 | Frazier et al. ............. 710/4 |
| 2002/0124117 | A1 * | 9/2002 | Beukema et al. ............. 709/314 |
| 2003/0050990 | A1 * | 3/2003 | Craddock et al. ............. 709/212 |
| 2003/0061296 | A1 * | 3/2003 | Craddock et al. ............. 709/212 |
| 2003/0065856 | A1 * | 4/2003 | Kagan et al. ............. 710/263 |
| 2004/0019882 | A1 * | 1/2004 | Haydt ............. 717/151 |
| 2004/0049580 | A1 * | 3/2004 | Boyd et al. ............. 709/226 |
| 2004/0049601 | A1 * | 3/2004 | Boyd et al. ............. 709/250 |
| 2004/0073622 | A1 * | 4/2004 | McDaniel et al. ............. 709/212 |
| 2004/0085984 | A1 * | 5/2004 | Elzur ............. 370/412 |
| 2004/0243738 | A1 * | 12/2004 | Day et al. ............. 710/22 |
| 2005/0066333 | A1 * | 3/2005 | Krause et al. ............. 719/310 |

(Continued)

Primary Examiner—Tonia L Dollinger
Assistant Examiner—Daniel C Murray
(74) Attorney, Agent, or Firm—Hoffman Warnick LLC; Joseph Petrokaitis

(57) ABSTRACT

A system and method of implementing asynchronous completion notification in an RDMA (remote data memory access) network interface card (RNIC). The method includes the steps of: storing a first CQE number of a most recent CQE placed into the CQ; storing a second CQE number of a most recent CQE retrieved from the CQ; issuing a request for completion notification; packaging the second CQE number with the request; and processing the request, wherein the processing step compares the first CQE number with the second CQE number to determine whether asynchronous completion notification should be immediately performed.

9 Claims, 3 Drawing Sheets

U.S. PATENT DOCUMENTS

| | | | |
|---|---|---|---|
| 2005/0120360 A1* | 6/2005 | Makhervaks et al. | 719/321 |
| 2005/0132017 A1* | 6/2005 | Biran et al. | 709/212 |
| 2005/0144310 A1* | 6/2005 | Biran et al. | 709/234 |
| 2005/0149623 A1* | 7/2005 | Biran et al. | 709/212 |
| 2005/0223118 A1* | 10/2005 | Tucker et al. | 709/250 |
| 2006/0129699 A1* | 6/2006 | Kagan et al. | 709/250 |
| 2006/0184948 A1* | 8/2006 | Cox | 719/313 |
| 2006/0212563 A1* | 9/2006 | Boyd et al. | 709/223 |
| 2006/0259570 A1* | 11/2006 | Feng et al. | 709/213 |
| 2008/0168194 A1* | 7/2008 | Gregg et al. | 710/52 |
| 2008/0256280 A1* | 10/2008 | Ma | 710/263 |

* cited by examiner

ASYNCHRONOUS COMPLETION NOTIFICATION FOR AN RDMA SYSTEM

BACKGROUND OF THE INVENTION

1. Technical Field

The present invention relates generally to RDMA (remote data memory access) systems, and more particularly relates to an asynchronous completion notification system for an RDMA network interface card.

2. Related Art

RDMA (remote data memory access) is a network interface card (NIC) feature that lets one computer directly place information into the memory of another computer. The technology reduces latency by minimizing demands on bandwidth and processing overhead. Traditional hardware and software architecture imposes a significant load on a server's CPU and memory because data must be copied between the kernel and application. Memory bottlenecks become more severe as connection speeds exceed the processing power and memory bandwidth of servers.

RDMA gets around this by implementing a reliable transport protocol in hardware on the NIC and by supporting zero-copy networking with kernel bypass. Zero-copy networking lets the NIC transfer data directly to or from application memory, eliminating the need to copy data between application memory and the kernel.

Kernel bypass lets applications issue commands to the NIC without having to execute a kernel call. The RDMA request is issued from user space to the local NIC and over the network to the remote NIC without requiring any kernel involvement. This reduces the number of context switches between kernel space and user space while handling network traffic.

The RDMA protocol is defined by the RDMA Consortium, which in part, maps the RDMA features of Infiniband onto Ethernet. The RDMA and InfiniBand standards provide the concept of a completion queue (CQ) for holding "consumer reports" about completion requests posted to the work (i.e., send or receive) queue. Each entry in the CQ is called a completion queue entry (CQE). The standards also provide the concept of an asynchronous completion notification mechanism, which is used to notify the consumer when a new CQE is placed in the CQ. In this mode of operation, the consumer can register an asynchronous completion notification handler, which is called when:

(1) the consumer requested asynchronous completion notification (by calling the request completion notification verb); and
(2) a new CQE is placed in the CQ (after the request completion notification verb was invoked).

The CQE can be retrieved from the CQ using the poll for completion verb.

As part of any efficient software implementation using an Asynchronous Completion Notification mechanism, the RNIC (remote network interface card) needs to guarantee that, given proper software behavior, no CQE will ever be left unattended in the CQ, i.e., each CQE placed to the CQ will either be retrieved by a Poll For Completion, or be indicated by a call to the Asynchronous Completion Notification Handler routine registered by the software.

Unfortunately, using known implementation techniques, situations may arise wherein one or more CQE's may be left unattended in the CQ. Accordingly, a need exists for an Asynchronous Completion Notification system that can guarantee that no CQE will ever be left unattended in the CQ.

SUMMARY OF THE INVENTION

The present invention addresses the above-mentioned problems, as well as others, by providing an asynchronous completion notification system and method that guarantees that no CQE will ever be left unattended in the CQ. In a first aspect, the invention provides an asynchronous completion notification system for use in an RDMA (remote data memory access) network interface card (RNIC) having a completion queue (CQ) for holding completion queue entries (CQEs), comprising: a system for storing a first CQE number of the most recent CQE placed into the CQ; a system for storing a second CQE number of the most recent CQE retrieved from the CQ; a system for packaging the second CQE number with each request completion notification verb that is issued; and a processing system for processing the request completion notification verb, wherein the processing system compares the first CQE number with the second CQE number to determine whether asynchronous completion notification should be immediately performed.

In a second aspect, the invention provides a method for implementing asynchronous completion notification in an RDMA (remote data memory access) network interface card (RNIC) having a completion queue (CQ) for holding completion queue entries (CQEs), comprising: storing a first CQE number of a most recent CQE placed into the CQ; storing a second CQE number of a most recent CQE retrieved from the CQ; issuing a request for completion notification; packaging the second CQE number with the request; and processing the request, wherein the processing step compares the first CQE number with the second CQE number to determine whether asynchronous completion notification should be immediately performed.

In a third aspect, the invention provides a system for implementing asynchronous completion notification in an RDMA (remote data memory access) network interface card (RNIC) having a completion queue (CQ) for holding completion queue entries (CQEs), comprising: means for storing a first CQE number of a most recent CQE placed into the CQ; means for storing a second CQE number of a most recent CQE retrieved from the CQ; means for issuing a request for completion notification; means for packaging the second CQE number with the request; and means for processing the request, wherein the processing means compares the first CQE number with the second CQE number to determine whether asynchronous completion notification should be immediately performed.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Overview

Figure 1:
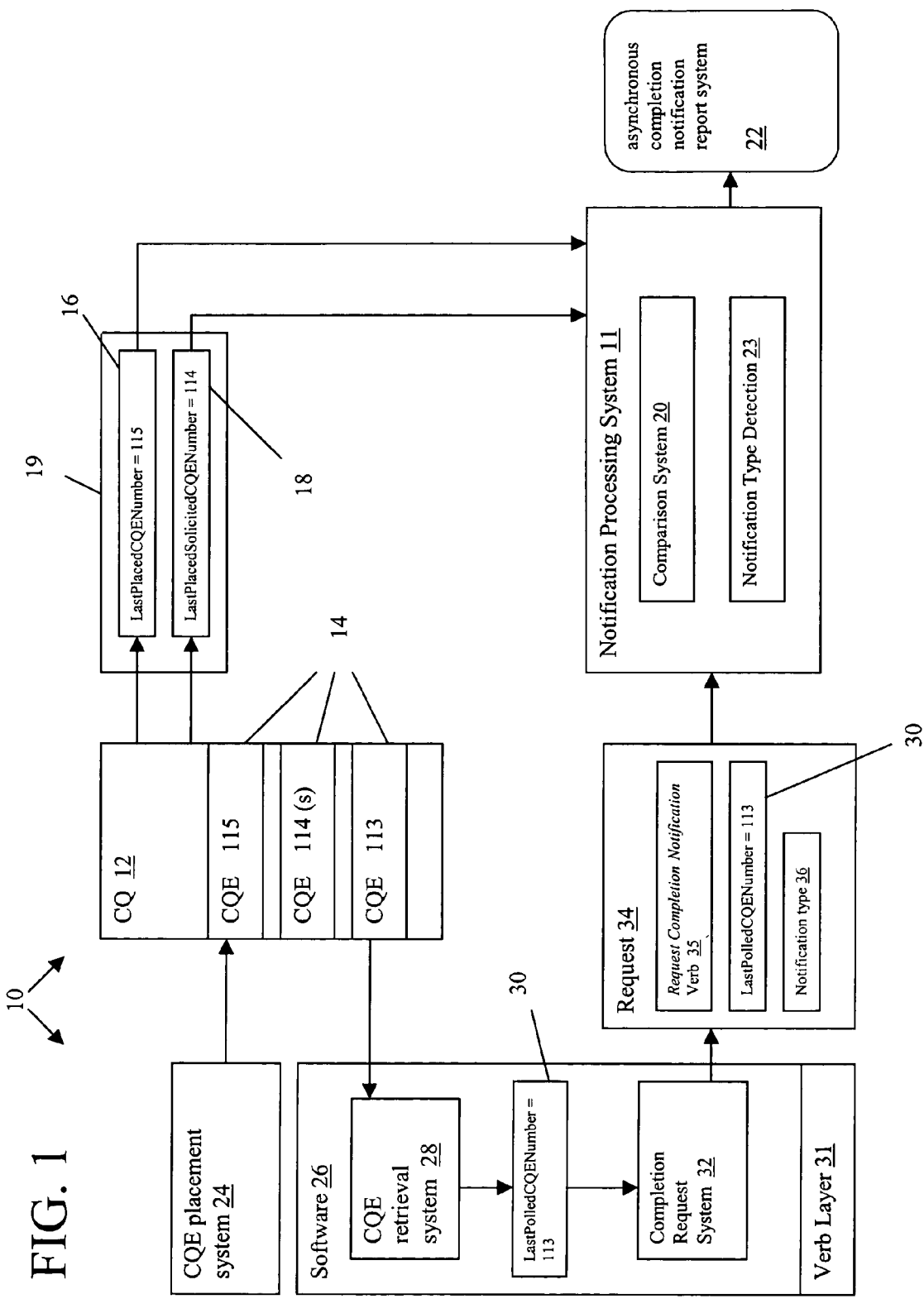
FIG. 1 depicts a diagram of an asynchronous notification system in accordance with the present invention.

Described below is an asynchronous completion notification system and method applicable to an RNIC (or other system implementing RDMA or InfiniBand), which guarantees that no CQE will ever be left unattended in the CQ. It is assumed for the purpose of this description that the reader has an understanding of the RDMA protocol and its implementation in an RNIC environment. The RDMA protocol is available on the Web at <www.rdmaconsortium.org/home>.

Exemplary Software Approaches

Various software approaches can be utilized to facilitate operations of an asynchronous completion notification system. As noted above, in an RDMA environment, an asynchronous completion notification system needs to guarantee that, given proper software behavior, no CQE will ever be left unattended in the CQ. A simple software operational mode to address this would be to:

(1) Poll For Completion to retrieve all CQEs from the CQ; and (2) Request Completion Notification to be interrupted when the new CQE is placed to CQ.

The problem that can arise with this approach is the possibility of a race between software calling a Request Completion Notification and hardware placing the next CQE in the CQ. When hardware gets the completion notification request, it cannot associate this request with CQEs placed to the CQ (i.e., it cannot identify a CQE that was placed before and after the Request Completion Notification verb has been called). The race may cause an undershoot condition in which a CQE is placed in the memory but no notification is set. In a worst-case scenario, a deadlock could occur when the application is waiting for notification for the last packet on which notification will not be asserted.

A second possible software approach, which would help address the problem identified with the first approach, is to apply a race resolution (similar to that used in addressing race problems in interrupt handling flows). In this case, race resolution is implemented in software by performing the following steps:

(1) Poll For Completion to retrieve all CQEs from the completion queue;

(2) Request Completion Notification to be interrupted when the new CQE is placed to CQ; and (3) Poll For Completion to retrieve one more CQE.

Unfortunately this modification of software flow does not guarantee that no unprocessed CQE is left in CQ. During the time between when the software issues a Request Completion Notification and the hardware detects this, several CQEs can be placed to the CQ, and since the software picks only one of them after calling to Request Completion Notification, other CQEs would be left unattended in the CQ. The Request Completion Notification basically results in a write to the device memory space. The delay in processing of this transaction can be caused by several factors, like bridges occurring between the CPU and the device, pipes and queues in device implementation, etc. Even use of multiple poll operations after requesting completion notification does not resolve the problem. The software still does not know when the indication of an empty CQ means that there is no pending CQE that would be left unattended, or if it just means that the hardware is still posting CQEs to the CQ.

Note that the problem could be overcome by taking the overshoot approach in which the worst-case delays are calculated between the notification and the last Poll For Completion request. However, the overshoot approach may result in a high probability of cases in which Poll For Completion is invoked when actually there is no new available CQE in the CQ. Accordingly, the present invention provides a more efficient asynchronous completion notification system that does not incur this overhead.

Asynchronous Completion Notification System

Referring to FIG. 1, an asynchronous completion notification system 10 is shown that allows the above exemplary software approaches to be used (as well as others) while guaranteeing that no CQE will be left unattended in the CQ. As shown, asynchronous completion notification system 10 includes a notification processing system 11 that processes requests 34 for asynchronous completion notification, and notifies asynchronous completion notification report system 22 when asynchronous completion notification should be performed in response to the request 34. In this exemplary embodiment, notification processing system 11 is implemented in hardware as a state machine. However, it should be recognized that notification processing system 11 could be implemented in software, firmware, or as a combination of the above.

Asynchronous completion notification system 10 operates in conjunction with a completion queue (CQ) 12, which holds completion queue entries (CQEs) 14. CQE's 14 are typically placed to the CQ 12 by a hardware device, shown here as a CQ placement system 24. CQE's 14 are typically retrieved out of the CQ 12 via software 26, i.e., using a poll for completion verb, depicted here as a CQE retrieval system 28. In the example depicted in FIG. 1, CQE 115 was the last, i.e., most recent, CQE to be placed in the CQ, and CQE 113 was the last, i.e., most recent, CQE to be retrieved from CQ 12. (Note that once retrieved, CQE 113 is technically no longer in the CQ 12.)

Figure 2:
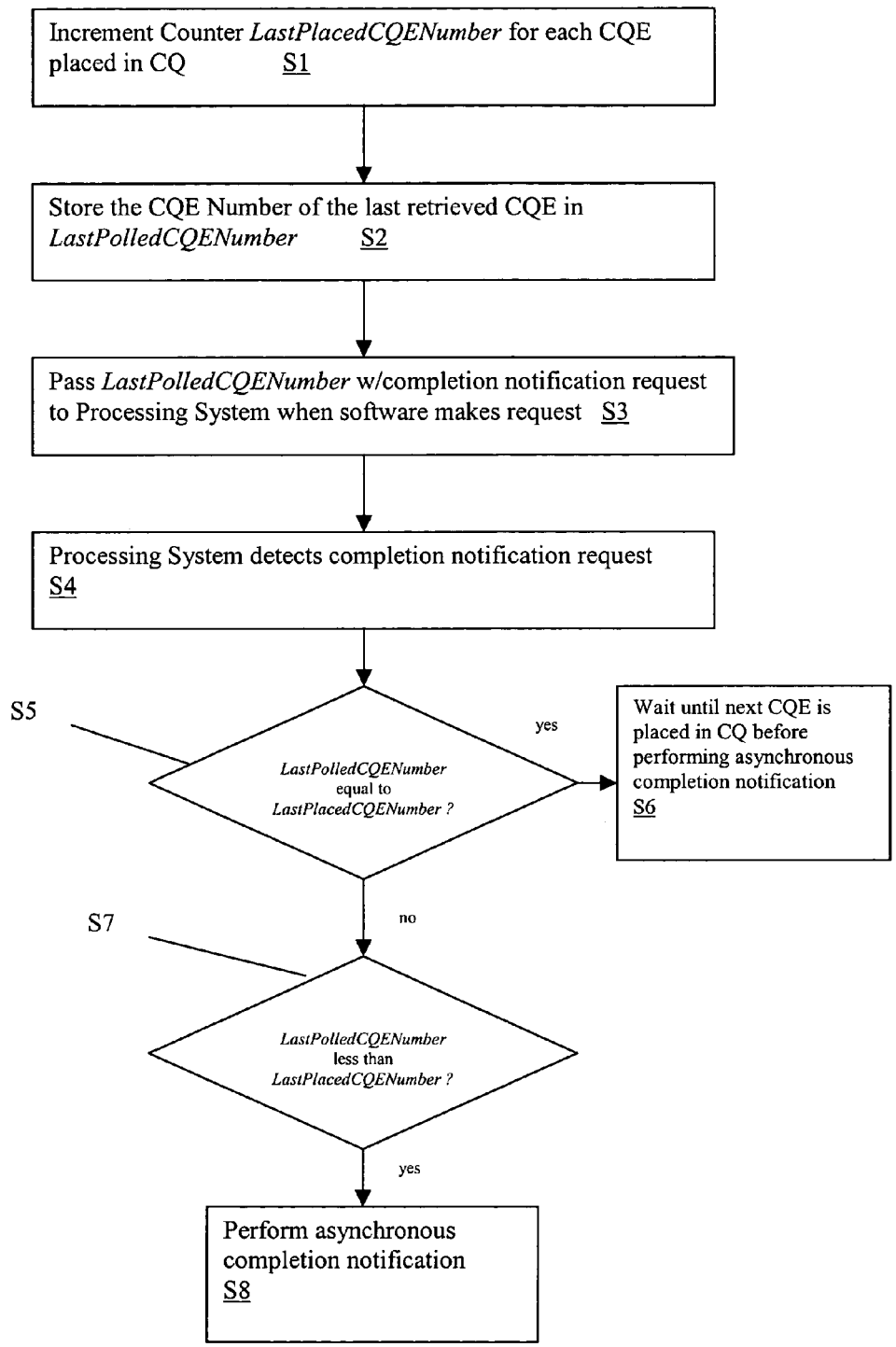
FIG. 2 depicts a flow diagram of a method of implementing asynchronous notification in accordance with the present invention.

Software 26 also includes a completion request system 32 for issuing a request 34 for asynchronous completion notification to the notification processing system 11. Request 34 generally comprises a request completion notification verb 35, which is defined in the RDMA protocol. Upon receiving the request 34, notification processing system 11 must determine when asynchronous completion notification (ACN) should be performed by the asynchronous completion notification report system 22. This process is facilitated by a comparison system 20, which examines CQE data to determine whether or not one or more CQEs 14 were placed in the CQ 12 since the last poll for completion. An exemplary methodology for implementing this process is described below with reference to both FIG. 1 and the flow diagram in FIG. 2.

For each CQ 12, a counter (LastPlacedCQENumber) 16 is maintained. This counter is incremented whenever a new CQE is placed to the CQ 12, see step S1 of FIG. 2. Thus, each CQE carries a momentary value of the LastPlacedCQENumber (after incrementing), i.e., CQENumber, which is maintained in CQ context 19. In other words, LastPlacedCQENumber keeps the CQENumber of the last CQE placed to the completion queue. In the example depicted in FIG. 1, LastPlacedCQENumber contains a CQENumber of 115, which identifies the last CQE placed in the CQ 12.

When software 26 retrieves a CQE from the completion queue 12, the verb layer 31 stores the CQENumber of the last retrieved CQE in LastPolledCQENumber 30 (step S2). In the example shown in FIG. 1, the last retrieved CQE was CQE 113. When completion request system 32 issues a request 34 for completion notification, the verb layer 31 passes the stored LastPolledCQENumber 30 with a request completion notification 35 to the notification processing system 11 (step S3). When the processing system 11 detects the request 34 (step S4), comparison system 20 compares the LastPolledCQENumer 30 carried by the request 34 with the LastPlacedCQENumber 16 kept in the CQ context (step S5).

If the LastPolledCQENumber 30 equals the LastPlacedCQENumber 16, then no CQE was placed to CQ since the last Poll For Completion, which preceded Request Completion Notification 35. Therefore, the asynchronous completion notification 32 should be performed only when the next CQE is placed to the CQ (step S6).

However, if the LastPolledCQENumber 30 is smaller than the LastPlacedCQENumber 16 (step S7), then one or more CQEs were placed to the CQ 12 after the software 26 called Request Completion Notification 35. Therefore, the asynchronous completion notification report system 22 is notified to immediately perform asynchronous completion notification (step S8).

In the example shown in FIG. 1, LastPolledCQENumber=113, which is less than LastPlacedCQENumber=115. This indicates that one or more CQEs were placed to the CQ 12 after the software 26 called Request Completion Notification 35. Specifically, it can be seen that CQEs 114 and 115 were placed into the CQE during this interval. Accordingly, for this example, asynchronous completion notification should be immediately performed.

This implementation of the asynchronous completion notification system 10 allows software 26 to use the simple software approach described above, without any risk of missing a CQE placed to CQ 12. Namely:

(1) Poll For Completion to retrieve all CQEs from the CQ; and
(2) Request Completion Notification to be interrupted when the new CQE is placed to CQ.

If software 26 implements the race resolution approach,
(1) Poll For Completion to retrieve all CQEs from the completion queue;
(2) Request Completion Notification to be interrupted when the new CQE is placed to CQ; and
(3) Poll For Completion to retrieve one more CQE.

There is a chance that software 26 will not find any CQE available in CQ 12 when performing asynchronous completion notification. However, this approach guarantees that no CQE will be placed to the completion queue without software 26 retrieving the CQE using Poll For Completion verb, or the RNIC device performing an asynchronous completion notification. This solution assumes that software 26 does not call both Poll For Completion and Request Completion Notification at the same time from the different threads (processes). This is a correct assumption because Poll For Completion and Request Completion Notification are non-privileged verbs that are supposed work without any kernel involvement, and all synchronization between those calls is left to the consumer or synchronization can be enforced on the verb layer.

It is further noted that the present embodiment can be extended to support both types of completion notifications, solicited and unsolicited defined by RDMA and InfiniBand. Solicited refers to a completion notification of a request requiring solicited notification, or request completed in error. Unsolicited refers to a completion notification of any other request. The asynchronous completion notification system 10 described above with reference to FIG. 2 allows asynchronous completion notification for requests requiring unsolicited completion.

Figure 3:
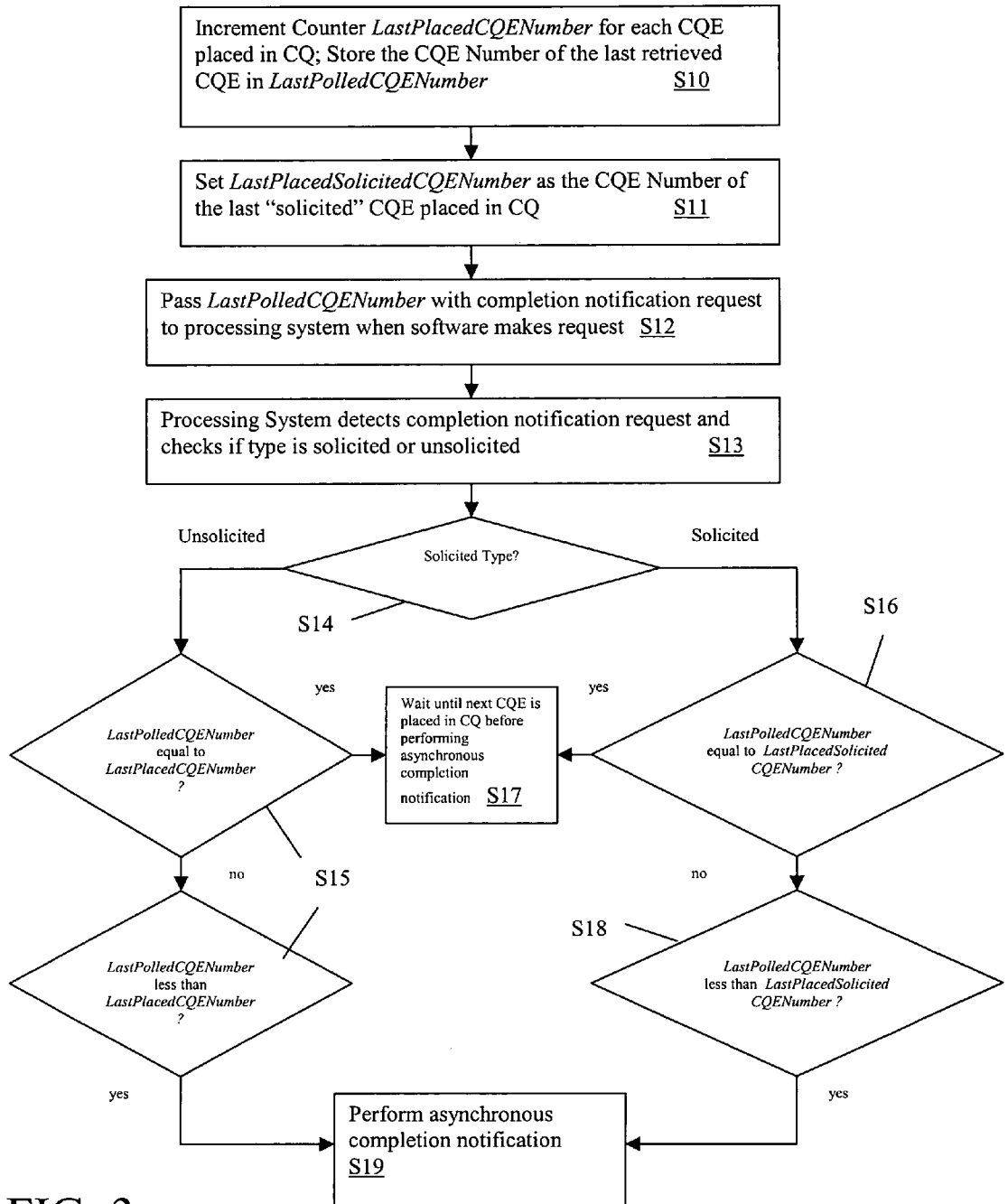
FIG. 3 depicts a flow diagram of a method of implementing solicited and unsolicited asynchronous notification in accordance with the present invention.

FIG. 3 depicts a flow diagram for handling solicited and unsolicited notifications. In the same manner described above, the LastPlacedCQENumber 16 is incremented for each CQE placed in the CQ 12, and the last retrieved CQE is stored in LastPolledCQENumber 30 (step S10). To extend the system 10 to support solicited notification, another field is added to the CQ context 19, which is shown in FIG. 1 as LastPlacedSolicitedCQENumber 18. This field is updated with a CQENumber when the CQE placement system 24 places a solicited CQE the CQ 12 (step S11).

When the software 26 issues a request 34, it not only passes the Request Completion Notification 35 and LastPolledCQENum (step S12), but also specifies a notification type 36, i.e., either solicited or unsolicited. Then, when the processing system 11 detects request completion notification (step S13), processing system 11 checks the type of completion notification at step S14 (i.e., solicited/unsolicited or both). For an unsolicited notification request, the methodology described above with reference to FIG. 2 is used, i.e., comparison system 20 compares LastPolledCQENumber with LastPlacedCQENumber (steps S15).

For a solicited notification request, comparison system 20 examines LastPlacedSolicitedCQENumber 18 instead of LastPlacedCQENumber 16. As noted, LastPlacedSolicitedCQENumber 18 includes the CQE number of the last CQE that was identified as solicited (i.e., solicited CQE). If LastPolledCQENumber 30 is equal to or greater than (e.g., if LastPolledCQENumber was 115) the LastPlacedSolicitedCQENumber 18 (step S16), then no solicited CQE was placed to CQ 12 since the last Poll For Completion, which preceded Request Completion Notification 35. Therefore, the asynchronous completion notification should be performed only when the next solicited CQE is placed to the CQ (step S17).

However, if the LastPolledCQENumber 30 is smaller than the LastPlacedSolicitedCQENumber 18 (step S18), then one or more solicited CQEs were placed to the CQ 12 after the software 26 called Request Completion Notification 35. Therefore, the asynchronous completion notification report system 22 should immediately perform asynchronous completion notification (step S19).

In the example depicted in FIG. 1, it can be seen that CQE 114 is identified as solicited (i.e., indicated in this example with an "(s)"). Thus, LastPlacedSolicitedCQENumber would be loaded with the value of 114, which would then be compared with LastPolledCQENumber, which has a value of 113. Thus, since LastPolledCQENumber is less than LastPlacedSolicitedCQENumber, asynchronous completion notification should be immediately performed in order to retrieve CQE 114.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A computer device containing hardware for implementing an asynchronous completion notification system for use in an RDMA (remote data memory access) network interface card (RNIC) having a completion queue (CQ) for holding completion queue entries (CQEs), comprising:
   a system for storing a first CQE number of the most recent CQE placed into the CQ, wherein the first CQE number is stored in a CQ context;
   a system for storing a second CQE number of the most recent CQE retrieved from the CQ, wherein the system for storing the second CQE number is implemented by a verb layer;
   a system for packaging the second CQE number with each request completion notification verb that is issued;
   a processing system for processing the request completion notification verb, wherein the processing system compares the first CQE number with the second CQE number to determine whether asynchronous completion notification should be immediately performed, and wherein the processing system causes asynchronous completion notification to be immediately performed if the second CQE number is less than the first CQE number or waits until a next CQE is placed into the CQ if the second CQE number is equal to the first CQE number; and
   a system for storing a third CQE number for the most recent solicited CQE placed into the CQ, wherein the request completion notification verb is further packaged with a type of completion notification; wherein the processing system includes a system for checking the type of completion notification; and wherein, if the type of completion notification is solicited, the processing compares the third CQE number with the second CQE number to determine whether asynchronous completion notification should be immediately performed.

2. The asynchronous completion notification system of claim 1, wherein if the type of completion notification is solicited, the processing system causes asynchronous completion notification to be immediately performed if the second CQE number is less than the third CQE number.

3. The asynchronous completion notification system of claim 1, wherein if the type of completion notification is solicited, the processing system waits until a next solicited CQE is placed into the CQ before causing asynchronous completion notification to be performed if the second CQE number is equal to or greater than the third CQE number.

4. A method for implementing asynchronous completion notification in an RDMA (remote data memory access) network interface card (RNIC) having a completion queue (CQ) for holding completion queue entries (CQEs), comprising:
   storing a first CQE number of a most recent CQE placed into the CQ in a CQ context;
   storing a second CQE number of a most recent CQE retrieved from the CQ;
   issuing a request for completion notification;
   packaging the second CQE number with the request;
   processing the request, wherein the processing step compares the first CQE number with the second CQE number to determine whether asynchronous completion notification should be immediately performed, wherein the processing immediately performs asynchronous completion notification if the second CQE number is less than the first CQE number or waits until a next CQE is placed into the CQ before performing asynchronous completion notification if the second CQE number is equal to the first CQE number;
   storing a third CQE number for the most recent solicited CQE placed into the CQ;
   packaging a type of completion notification with the request;
   checking the type of completion notification during the processing step; and
   if the type of completion notification is solicited, comparing the third CQE number with the second CQE number to determine whether asynchronous completion notification should be immediately performed.

5. The method of claim 4, wherein if the type of completion notification is solicited, the processing step immediately performs asynchronous completion notification if the second CQE number is less than the third CQE number.

6. The method of claim 4, wherein if the type of completion notification is solicited, the processing step waits until a next solicited CQE is placed into the CQ before performing asynchronous completion notification if the second CQE number is equal to or greater than the third CQE number.

7. A computer device containing hardware for implementing a system for implementing asynchronous completion notification in an RDMA (remote data memory access) network interface card (RNIC) having a completion queue (CQ) for holding completion queue entries (CQEs), comprising:
   means for storing a first CQE number of a most recent CQE placed into the CQ;
   means for storing a second CQE number of a most recent CQE retrieved from the CQ;
   means for issuing a request for completion notification;
   means for packaging the second CQE number with the request;
   means for processing the request, wherein the processing means compares the first CQE number with the second CQE number to determine whether asynchronous completion notification should be immediately performed, wherein the processing means immediately performs asynchronous completion notification if the second CQE number is less than the first CQE number or waits until a next CQE is placed into the CQ before performing asynchronous completion notification if the second CQE number is equal to the first CQE number.
   means for storing a third CQE number for the most recent solicited CQE placed into the CQ;
   means for packaging a type of completion notification with the request;
   means for checking the type of completion notification; and
   means for comparing the third CQE number with the second CQE number if the type of completion notification is solicited, to determine whether asynchronous completion notification should be immediately performed.

8. The system of claim 7, wherein the processing means immediately performs asynchronous completion notification if the type of completion notification is solicited and if the second CQE number is less than the third CQE number.

9. The system of claim 7, wherein the processing means waits until a next solicited CQE is placed into the CQ before performing asynchronous completion notification if the type of completion notification is solicited and if the second CQE number is equal to or greater than the third CQE number.

* * * * *